United States Patent [19]
Kato et al.

[11] Patent Number: 6,021,137
[45] Date of Patent: Feb. 1, 2000

[54] DATA COLLECTION SYSTEM

[75] Inventors: Shuzo Kato, Yokohama; Kazuhiko Seki, Tokyo, both of Japan

[73] Assignee: Uniden Corporation, Tokyo, Japan

[21] Appl. No.: 08/800,332

[22] Filed: Feb. 14, 1997

[30]    Foreign Application Priority Data

Aug. 27, 1996  [JP]  Japan ................................. 8-225580

[51] Int. Cl.[7] ................................................. H04J 13/02
[52] U.S. Cl. .................................... 370/479; 340/259
[58] Field of Search .................................. 370/479, 458, 370/342, 441; 340/310.06, 825.07, 825.54; 375/259

[56]          References Cited

U.S. PATENT DOCUMENTS

| | | | |
|---|---|---|---|
| 4,724,435 | 2/1988 | Moses et al. | 340/870.13 |
| 4,805,166 | 2/1989 | Ardon et al. | 370/366 |
| 4,893,318 | 1/1990 | Potash et al. | 375/358 |
| 5,142,690 | 8/1992 | McMullan et al. | 370/249 |
| 5,197,125 | 3/1993 | Engel et al. | 370/458 |
| 5,319,634 | 6/1994 | Bartholomew et al. | 370/441 |
| 5,448,593 | 9/1995 | Hill | 375/267 |
| 5,504,746 | 4/1996 | Meier | 370/256 |
| 5,764,685 | 6/1998 | Tanaka | 375/200 |
| 5,777,544 | 7/1998 | Vander Mey et al. | 370/344 |
| 5,802,496 | 9/1998 | Uchiyama et al. | 705/21 |
| 5,835,005 | 11/1998 | Furukawa et al. | 340/310.01 |
| 5,862,133 | 1/1999 | Schilling | 370/342 |

FOREIGN PATENT DOCUMENTS

| | | |
|---|---|---|
| 58-120360 | 7/1983 | Japan . |
| 58-148636 | 9/1983 | Japan . |
| 59-100655 | 6/1984 | Japan . |
| 60-162326 | 8/1985 | Japan . |
| 61-194926 | 8/1986 | Japan . |
| 62-127140 | 8/1987 | Japan . |
| 63-109617 | 5/1988 | Japan . |
| 63-209440 | 8/1988 | Japan . |
| 5-176373 | 7/1993 | Japan . |
| 6-54381 | 7/1994 | Japan . |
| 3022948 | 1/1996 | Japan . |

OTHER PUBLICATIONS

Figure 3 extracted from U.S. Patent 5537414 as a good example of timing style illustration, Jul. 16, 1996.

*Primary Examiner*—Chau Nguyen
*Assistant Examiner*—Fred Wolkow
*Attorney, Agent, or Firm*—McDermott, Will & Emery

[57]           ABSTRACT

A data collection system in which, in communications between each of terminal units and a data collector through a power line, the data collector subjects a polling signal generated by a polling generating circuit to spread spectrum modulation by a spreading section, and superimposes the spread signal on the power line, while each of the terminal units subjects the incoming spread signal thereto superimposed on the power line to de-spread spectrum demodulation and recognizes it, and superimposes the data subjected to spread spectrum modulation on the power line after a certain period of time different from that in other terminal unit has passed. The data collector collects the data obtained by subjecting spread signals successively coming thereinto each by being superimposed on the power line to de-spread spectrum demodulation according to the polling.

24 Claims, 12 Drawing Sheets

FIG.4

| TERMINAL NUMBER SECTION | DATA SECTION |

FIG.5

| POLLING TIME | No.1 (TERMINAL UNIT2) | No.2 (TERMINAL UNIT3) | No.3 (TERMINAL UNIT4) |
|---|---|---|---|
| PT1 | DTA1 | DTB1 | DTC1 |
| PT2 | DTA2 | DTB2 | DTC2 |
| ... | ... | ... | ... |
| PTN | DTAN | DTBN | DTCN |

13

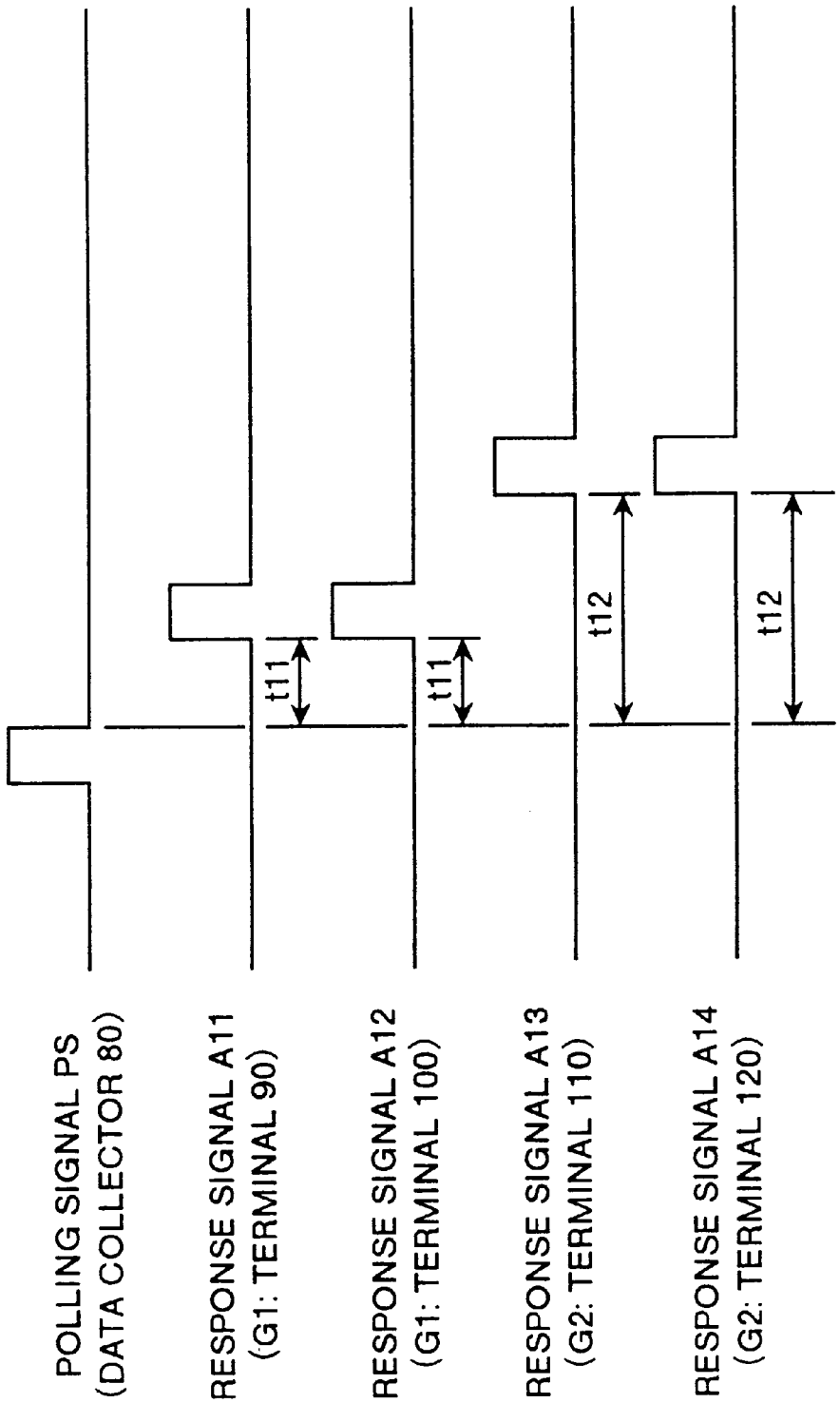

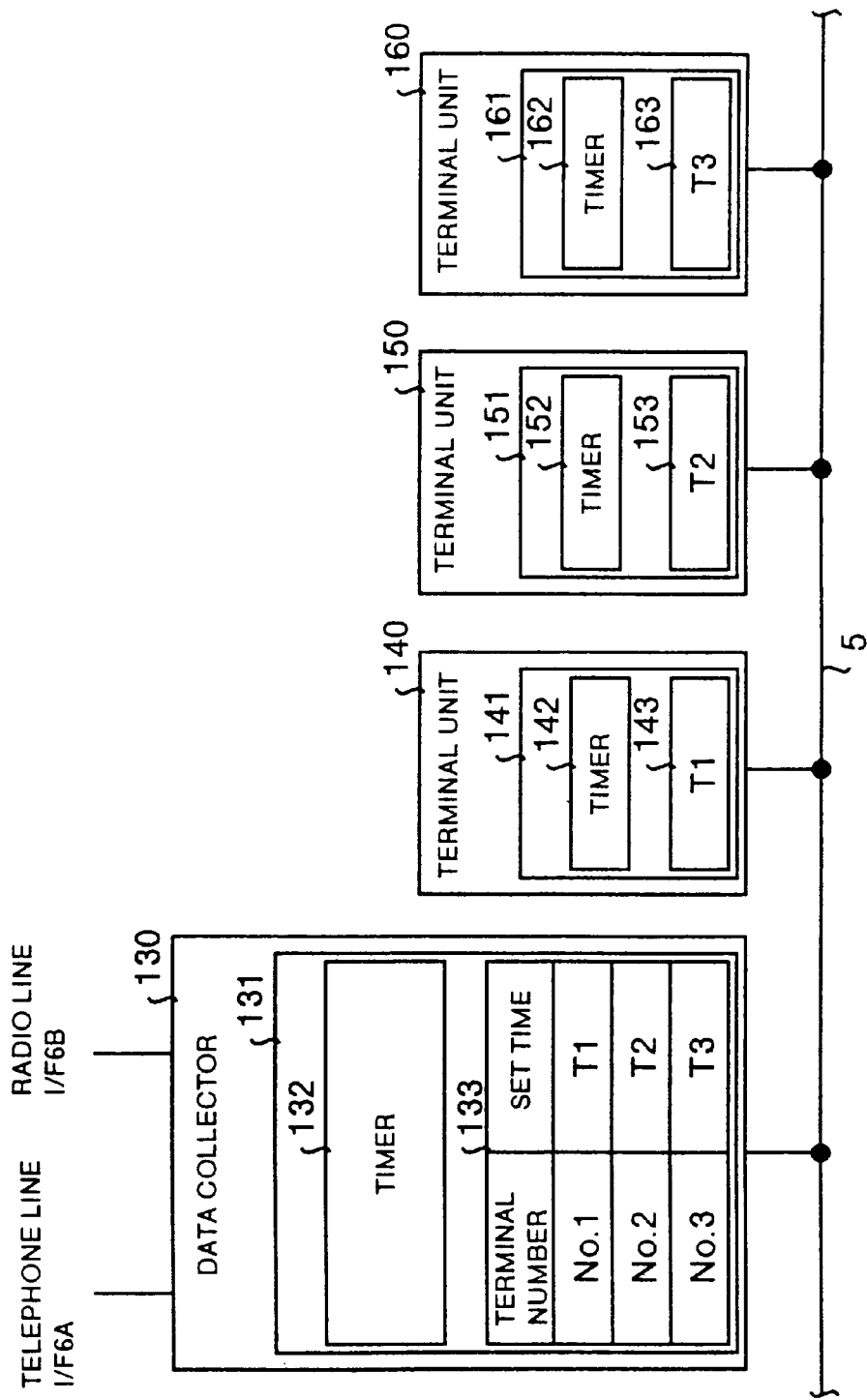

DATA COLLECTION SYSTEM

FIELD OF THE INVENTION

The present invention relates to a data collection system, and more particularly to a data collection system for executing data collection by superimposing data on a power line and extracting the superimposed data from the power line.

BACKGROUND OF THE INVENTION

This type of data collection system is mostly used for data collection from one or a plurality of terminal units each provided in a place difficult of access for an electric wave, such as basement of a building.

In a building, a power line is laid to an underground section thereof, so that, if each of the plurality of terminal units is connected to a data collector with a power line, the data collector can collect data via the power line from each of the terminal units.

In recent years, to achieve improvement of an S/N ratio or to realize high speed transmission in a transmission path with a power line, there have been proposed a data collection systems, in which data is superimposed on a power line by means of spread spectrum modulation and extracting the data from the power line by spread spectrum modulation.

A similar technology using spread spectrum communication is disclosed in, for instance, Japanese Patent Laid-Open Publication No. SHO 60-162326. Disclosed in this publication is a technology in which, in a case where data is transmitted from a terminal unit, the terminal unit checks a transmission state of each of other terminal units from a signal level on a power line and confirms that any of the terminal units does not transmit any data.

Although the technology disclosed in the publication is effective in preventing signals transmitted from each of the terminal units from colliding with any other signal on the identical transmission path, in turn the transmission cannot be made until it is detected that the transmission path is available.

SUMMARY OF THE INVENTION

It is an object of the present invention to provide a data collection system in which data collection is executed by a data collector even if each of the terminal units does not confirm a transmission state of other terminal units.

To solve the problem described above and to achieve the object described above, with a data collection system according to the present invention, in communications between each of terminal units and a data collector through a power line, each of the terminal units transmits data subjected to spread spectrum modulation according to a specified request signal transmitted from the data collector, and the data collector demodulates the received data by de-spreading spectrum and executes data collection, so that each of the terminal units only starts an operation for transmission at a point of time when a specified request signal is sent thereto from the data collector. With this feature, the data collector can execute data collection even if each of the terminal units does not confirm a transmission state of other terminal units.

With a data collection system according to the present invention, in communications between each of terminal units and a data collector through a power line, each of the terminal units transmits data subjected to spread spectrum modulation according to a specified request signal simultaneously transmitted from the data collector to a plurality of terminal units after a certain period of time different from that in other terminal units has passed and the data collector executes data collection by subjecting the received data to de-spread spectrum demodulation, so that each of the terminal units has only to start the operation for transmission at a point of time when a specified request signal is transmitted from the data collector at a timing different from that in other terminal unit. With this feature, data collector can execute data collection even if each of the terminal units does not confirm a transmission state of other terminal units.

With a data collection system according to the present invention, in communications between each of terminal units and a data collector through a power line, each of the terminal units transmits data subjected to spread spectrum modulation at a preset clock different from that in other terminal unit, and the data collector executes data collection by subjecting the received data to de-spread spectrum demodulation, so that each of the terminal units has only to start an operation for transmission at a preset clock different from that in other terminal unit. With this feature, the data collector can execute data collection even if each of the terminal units does not confirm a transmission state of other terminal units.

With a data collection system according to the present invention, a data collector processes the data subjected to spread spectrum modulation using a common specified spread code from a plurality of terminal units, to provide spread spectrum demodulation by a shared de-spreading circuit, so that a unit of de-spreading circuit is only prepared in the side of data collector regardless of the number of terminal units, and with this feature, system configuration can be simplified.

With a data collection system according to the present invention, in communications between each of terminal units and a data collector through a power line, each of the plurality of terminal units transmits data subjected to spread spectrum modulation using spread code different for each terminal unit, and the data collector subjects the received data to de-spread spectrum demodulation using the spread code identical to that used for subjecting the data to spread spectrum modulation and executes data collection, so that the data collector can demodulate data from any of the terminal units using spread code specific to each of the terminal units, and for this reason, each of the terminal units has only to start an operation for transmission at a given timing, and with this feature, the data collector can execute data collection even if each of the terminal units does not confirm a transmission state from other terminal unit.

With a data collection system according to the present invention, in communications between each of terminal units and a data collector through a power line, each of the terminal units transmits data subjected to spread spectrum modulation using spread code different for each of the terminal units in at least the same terminal group according to a specified request signal simultaneously transmitted from the data collector to a plurality of terminal groups after a certain period of time different for each terminal group passed, and the data collector subjects the received data to de-spread spectrum demodulation using the spread code identical to that used for subjecting the data to spread spectrum modulation and executes data collection, so that the data collector can subject data from any of the terminal units to demodulation using spread code specific to each of the terminal units, and for this reason, each of the terminal groups has only to start an operation for transmission at a timing different from that in other terminal groups in a case where a specified request signal is sent thereto from the data collector. With this feature, the data collector can execute data collection even if each of the terminal units does not confirm a transmission state of other terminal units.

With a data collection system according to the present invention, the data collecting means multiplexes data transmitted from the plurality of terminal units and demodulated by the demodulating means, and with this feature, data from the plurality of terminal units can be handled as multiplexed data in batch.

With a data collection system according to the present invention, the data collector subjects a specified request signal to spread spectrum modulation for transmission, and each of the terminal units subjects the specified request signal to de-spread spectrum demodulation for receiving, so that communications between the specified request signal and the data can be executed on the identical power line, and with this feature, modulation/demodulation processing for transmit-receive of data can be unified.

With a data collection system according to the present invention, a specified request signal is transmitted as a polling signal, so that request signals can easily be transmitted to a plurality of terminal units at one time.

With a data collection system according to the present invention, each of the terminal units adds identification data specific to each terminal unit to data when the data is subjected to modulation, and the data collector manages the data in each of the terminal units according to the identification data added to the received data, so that the data collector can identify from which terminal unit the data is even after the data has been received thereby.

With a data collection system according to the present invention, the data collector executes cable data communication with an external device, so that data collected by the data collector from each of the terminal units can be transferred to remote places through a cable line.

With a data collection system according to the present invention, the data collector executes radio data communication with an external device through a radio terminal connected thereto, so that data collected by the data collector from each of the terminal units can be transferred to remote places through a radio line.

Other objects and features of this invention will become understood from the following description with reference to the accompanying drawings.

BRIEF DESCRIPTION OF THE DRAWINGS

FIG. 4 is a view showing an example of a format of a response signal according to the first embodiment;

FIG. 5 is a view showing an example of memory contents of the data memory in the data collector in the first embodiment;

FIG. 11 is a timing chart between a polling signal and the response signal in the third embodiment; and FIG. 12 is a block diagram showing the data collection system according to a fourth embodiment of the present invention.

DESCRIPTION OF THE PREFERRED EMBODIMENTS

Detailed description is made hereinafter for preferred embodiments of the present invention with reference to the related drawings.

Figure 1:
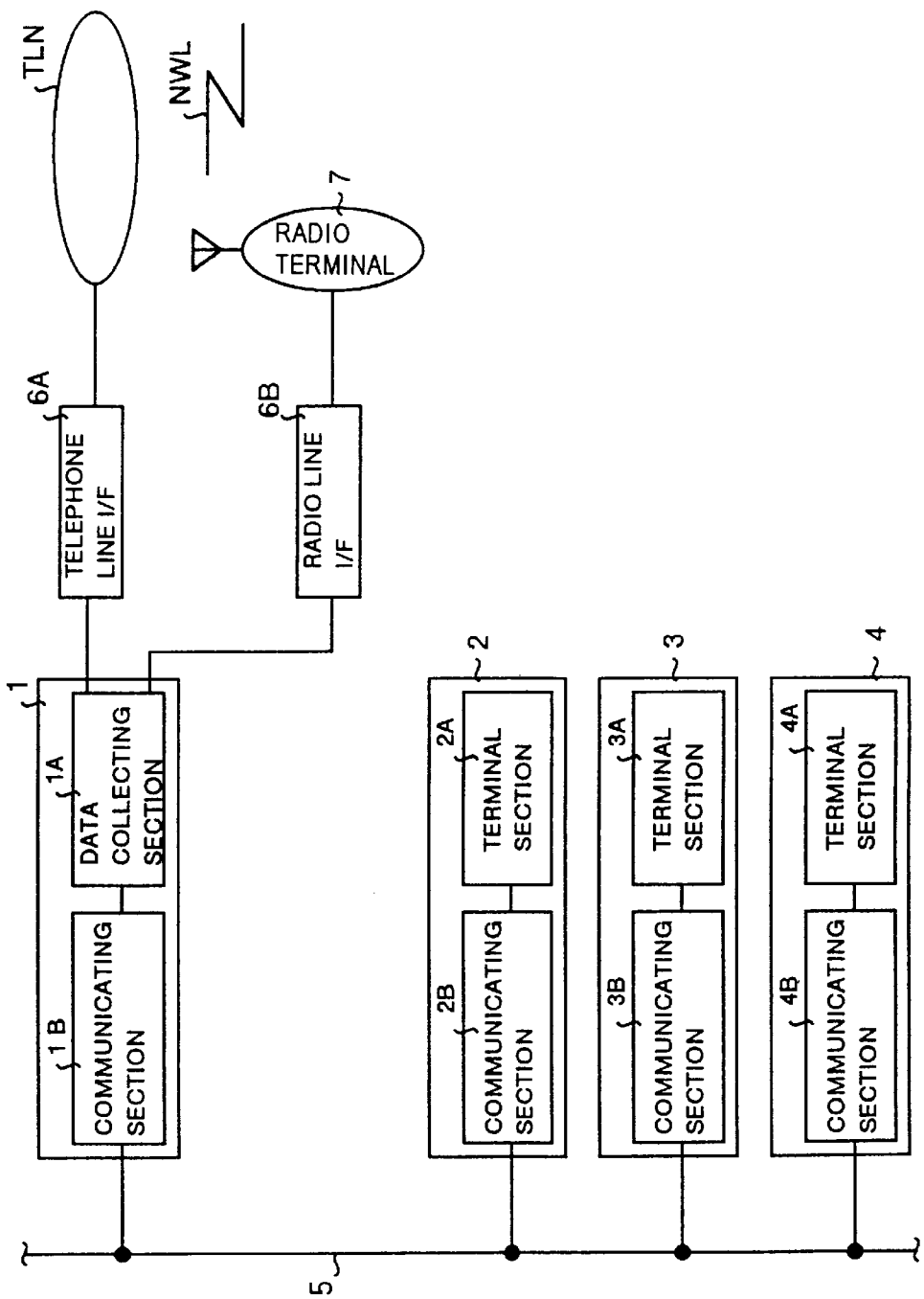
FIG. 1 is a block diagram showing the data collection system according to a first embodiment of the present invention.

FIG. 1 is a block diagram showing the data collection system according to a first embodiment of the present invention. In the data collection system shown in FIG. 1, a data collector 1 and a plurality of terminal units (e.g. terminal units 2, 3, 4) for storing data are connected to each other with a power line 5 such as a line for lighting, and data communications between the data collector 1 and each of the terminal units 2, 3, 4 is executed via the power line 5.

Connected to the data collector 1 are a telephone line I/F (interface) 6A for connection to a telephone line network TLN and a radio line I/F 6B for connection to a radio terminal 7. The radio terminal 7 is a terminal such as a PHS (Portable Handyphone System) for forming a radio line NWL with a radio line network not shown herein and executing bidirectional communications.

The data collector 1 comprises a data collecting section 1A and a communicating section 1B. The data collecting section 1A connected to the communicating section 1B, the telephone line I/F 6A, and the radio line I/F 6B, collects data sent thereto from each of the terminal units 2, 3, 4 via the communicating section 1B, and transmits the collected data to an external device not shown herein via the telephone line I/F 6A or the radio line I/F 6B.

The communicating section 1B is a unit for executing spread spectrum communication, subjects data from the data collecting section 1A to spread spectrum modulation, superimposes the spread signal on the power line 5, and transmits the superimposed signal to each of the terminal units 2, 3, 4, and reversely extracts required data by subjecting the incoming spread signal via the power line 5 from each of the terminal units 2, 3, 4 to de-spread spectrum demodulation.

The terminal units 2, 3, and 4 comprise terminal sections 2A, 3A, and 4A, and communicating sections 2B, 3B, and 4B respectively. Any of the terminal sections 2A, 3A, 4A may be a vending machine such as an automatic vending machine, and may store a number of sales for each item (or a number of inventories therein) as data.

The communicating section 2B, 3B, and 4B are units for executing spread spectrum communications, and subjects data for the terminal section 2A, 3A, and 4A to spread spectrum modulation, superimposes the spread signals on the power line 5, and transmits them to the data collector 1, and reversely extracts required data by subjecting the incoming spread signals via the power line 5 from the data collector 1 to despread spectrum demodulation.

Figure 2:
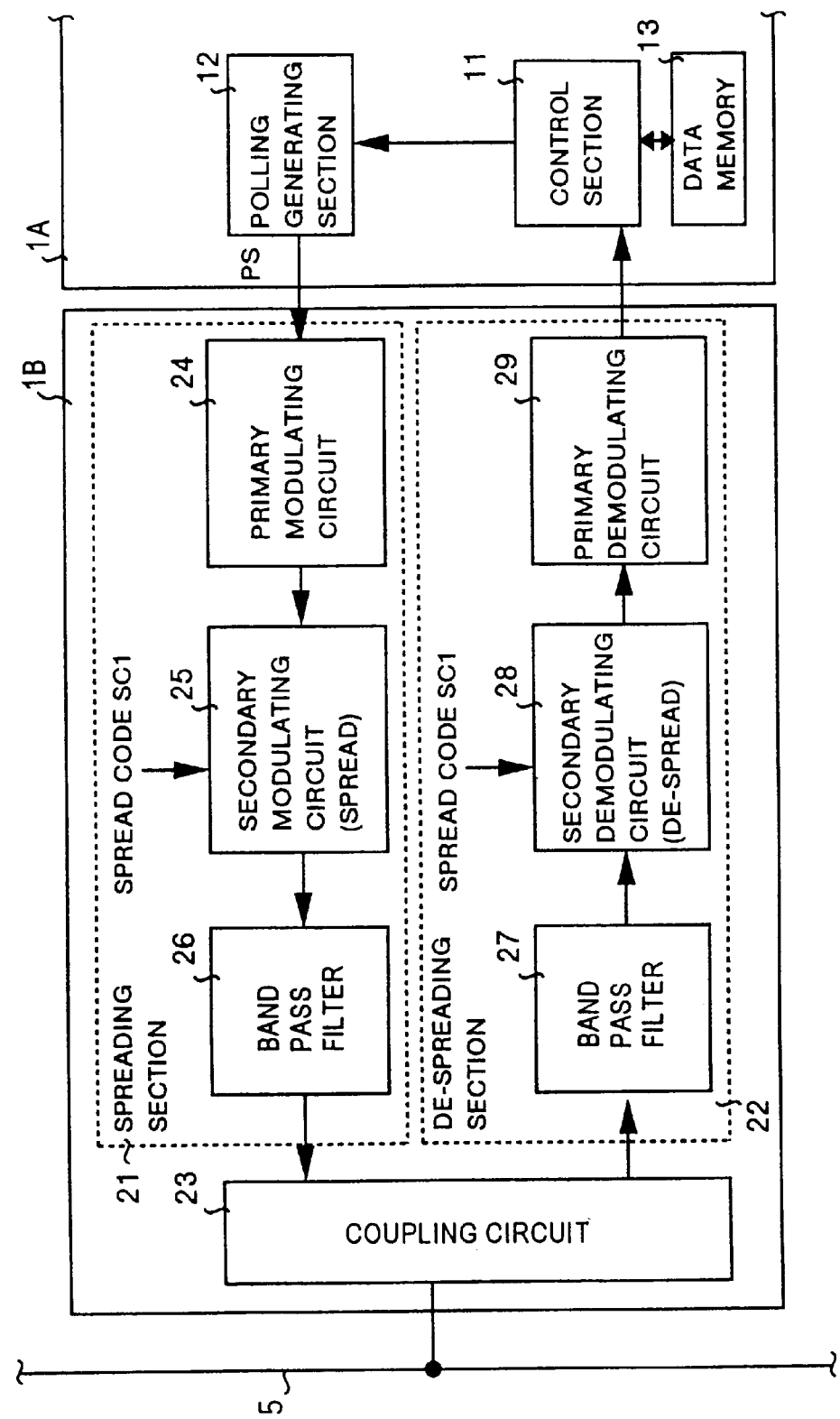
FIG. 2 is a block diagram showing the internal configuration of the data collector according to the first embodiment.

Next detailed description is made for the data collector 1. FIG. 2 is a block diagram showing the internal configuration of the data collector 1. The data collecting section 1A comprises a control section 11, a polling generating circuit 12, and a data memory 13 or the like.

The control section 11 has a CPU, a ROM, and a RAM or the like which are not shown herein, and controls the entire data collector 1. The CPU described above operates according to a control program stored in the ROM, and uses the RAM as a work area during the operation.

It should be noted that there are included in the control program such programs as those for communications with each of the terminal units 2, 3, and 4, communications with the telephone line network TLN, communications with a radio line network not shown herein, processing for generation of polling and for receiving of the response, and key-entry processing by operating an input section not shown herein connected to the control section 11.

The polling generating section 12 supplies a polling signal PS to a primary modulating circuit 24 described later in the communicating section 1B according to control provided by the control section 11. The data memory 13 is a storage medium enabling read/write operations, and stores therein data collected from each of the terminal units 2, 3, and 4 by polling.

The communicating section 1B comprises a spreading section 21, a de-spreading section 22, and a coupling circuit 23. The spreading section 21, de-spreading section 22, and power line 5 are connected to the coupling circuit 23.

The spreading section 21 comprises the primary modulating circuit 24, a secondary modulating circuit 25, and a band-pass filter (described as BPF hereinafter) 26.

The primary modulating circuit 24 obtains a primarily modulated signal by modulating a polling signal PS generated by the polling generating circuit 12 by means of ASK (Amplitude Shift Keying) or PSK (Phase Shift Keying) or the like.

The secondary modulating circuit 25 is a circuit for executing spread spectrum modulation, and obtains a secondary modulated signal, namely a spread signal by superimposing spread code SC1 having a sufficiently higher speed than a data transmission speed on the primar modulated signal supplied from the primary modulating circuit 24.

The BPF 26 is a filter for letting pass therethrough a signal (a spread signal) existing in a frequency band (e.g. 10 KHz to 400 KHz) of a frequency higher than that in a frequency band (50 Hz to 60 Hz) of the power line 5. A transmission signal outputted from the BPF 26 is superimposed on the power line 5 via the coupling circuit 23.

The de-spreading section 22 comprises a BPF 27, a secondary demodulating circuit 28, and a primary demodulating circuit 29.

The BPF 27 is a filter for letting pass therethrough a signal (a spread signal) existing in a frequency band (e.g. 10 KHz to 400 KHz) of a high frequency identical to that in the BPF 26 among received signals each supplied from the power line 5 via the coupling circuit 23. It should be noted that the received signal described above is a spread signal sent thereto from each of the terminal units 2, 3, and 4 in response to polling.

The secondary demodulating circuit 28 is a circuit for detecting correlation between received signals and subjecting the signals to de-spread spectrum demodulation, and superimposes spread code having the same code array as that in the spread code used for spread spectrum, namely spread code SC1 on the received signal (spread signal) supplied from the BPF 27 for regenerating a primarily modulated signal. It should be noted that this primarily modulated signal is a response signal subjected to a primary modulation in each of the terminal units 2, 3, and 4.

The primary demodulating circuit 29 subjects the primarily modulated signal supplied from the secondary demodulating circuit 28 to primary demodulation and regenerates the original response signal. The primary demodulating circuit 29 sends out the regenerated response signal to the control unit 11.

Figure 3:
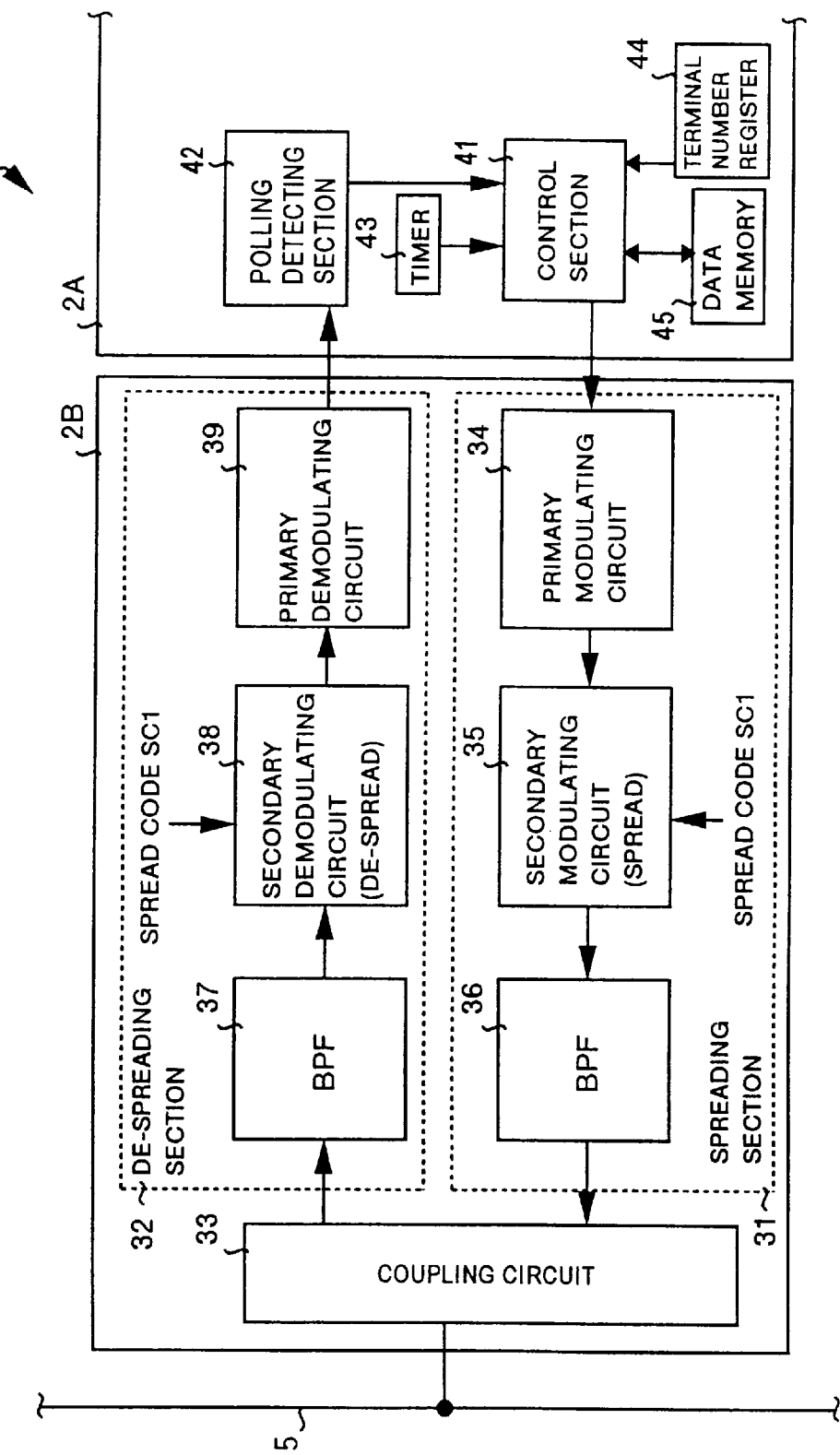
FIG. 3 is a block diagram showing main internal configuration of the terminal unit according to the first embodiment.

Next, a detailed description is made for each of the terminal units 2, 3, and 4. FIG. 3 is a block diagram showing main internal configuration of the terminal unit according to the first embodiment. FIG. 3 shows internal configuration of the terminal unit 2 as a representative example, and other terminal units 3 and 4 have configurations in each of which the same reference numerals are assigned to the sections corresponding to those in the terminal unit 2.

The terminal section 2A comprises a control section 41, a polling detecting circuit 42, a timer 43, a terminal number register 44, and a data memory 45 or the like.

The control section 41 has a CPU, ROM, and RAM or the like which are not shown herein, and controls the entire terminal unit 2. The CPU described above operates according to a control program stored in the ROM, and uses the RAM as a work area during the operation.

It should be noted that there are included in the control program such programs as those for communications with the data collector 1, and processing for detection of polling and for transmission of the response.

The polling detecting circuit 42 detects the polling signal PS demodulated by the de-spreading section 32 in the communicating section 2B described later and supplies the detected signal to the control section 41. The timer 43 measures a period of time for responding to the polling with a different time slot for each of the terminal units 2, 3, and 4.

The terminal number register 33 stores data for any terminal number specifically allocated to each of the terminal units 2, 3, and 4 so that the data can be read out therefrom. The data memory 45 stores data for a number of sold articles (or a number of inventories therein) according to sales of each items in the control section 41 so that the data can be read out therefrom.

Data for terminal numbers stored in the terminal number register 44 and data stored in the data memory 45 are read out by the control section 41 using polling, and supplied to a primary modulating circuit 34 in the communicating section 2B as a response signal.

The communicating section 2B comprises a spreading section 31, a de-spreading section 32, and a coupling circuit 33 or the like. The spreading section 31, de-spreading section 32, and power line 5 are connected to the coupling circuit 33.

The spreading section 31 comprises the primary modulating circuit 34, a secondary modulating circuit 35, and a BPF 36. The primary modulating circuit 34 obtains a primarily modulated signal by modulating a response signal supplied from the control section 41 by means of ASK or PSK or the like.

The secondary modulating circuit 35 is a circuit for executing spread spectrum modulation, and obtains a secondarily modulated signal, namely a spread signal by superimposing the same spread code SC1 as that in the data collector 1 on the primar modulated signal supplied from the primary modulating circuit 34.

The BPF 36 is a filter for letting pass therethrough a signal (a spread signal) in a frequency band of the same high frequency as that of the BPF 26 in the data collector 1. A transmission signal outputted from the BPF 36 is superimposed on the power line 5 via the coupling circuit 33.

The de-spreading section 32 comprises a BPF 37, a secondary demodulating circuit 38, and a primary demodulating circuit 39.

The BPF 37 is a filter for letting pass therethrough a signal (a spread signal) existing in a frequency band of a high frequency identical to that in the BPF 26 among received signals each supplied from the power line 5 via the coupling circuit 33.

The secondary demodulating circuit 38 is a circuit for detecting correlation between the received signals and subjecting the signals to de-spread spectrum demodulation, and superimposes spread code having the same code array as that in the spread code used for spread spectrum, namely spread code SC1 on the received signal (spread signal) supplied from the BPF 37 for regenerating a primarily modulated signal. It should be noted that this primarily modulated signal is a response signal subjected to a primary modulation in the data collector 1.

The primary demodulating circuit 39 subjects the primarily modulated signal supplied from the secondary demodulating circuit 38 to primary demodulation and regenerates the original polling signal PS. The primary demodulating circuit 39 sends out the regenerated polling signal PS to the polling detecting circuit 42.

Figure 4:
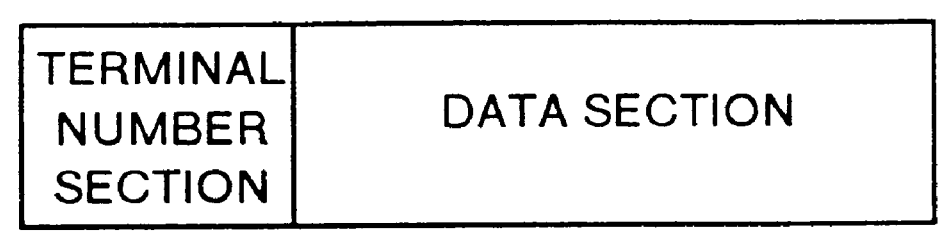

Next, a description is made for a data form. FIG. 4 is a view showing an example of a format for a response signal. A response signal has a format, as shown in FIG. 4, in which a terminal number section and a data section correspond to each other, and data for terminal numbers each stored in the terminal number register 44 is set in the terminal number section, while data stored in the data memory 45 is set in the data section.

FIG. 5 is a view showing an example of memory contents of the data memory 13 in the data collector 1, and in the figure, the reference numerals PT1 to PTN each indicate a point of time when polling is generated (described as a polling time hereinafter), DTA1 to DTAN (N is a natural number) each indicate data received from the terminal unit 2, DTB1 to DTBN each indicate data received from the terminal unit 3, and DTC1 to DTCN each indicate data received from the terminal unit 4 respectively.

Data for DTA1 to DTAN and data for DTB1 to DTBN, DTC1 to DTCN are formed each in the data section with the format of the response signal shown in FIG. 4 respectively, and are stored therein in correspondence to polling times PT1 to PTN.

Figure 6:
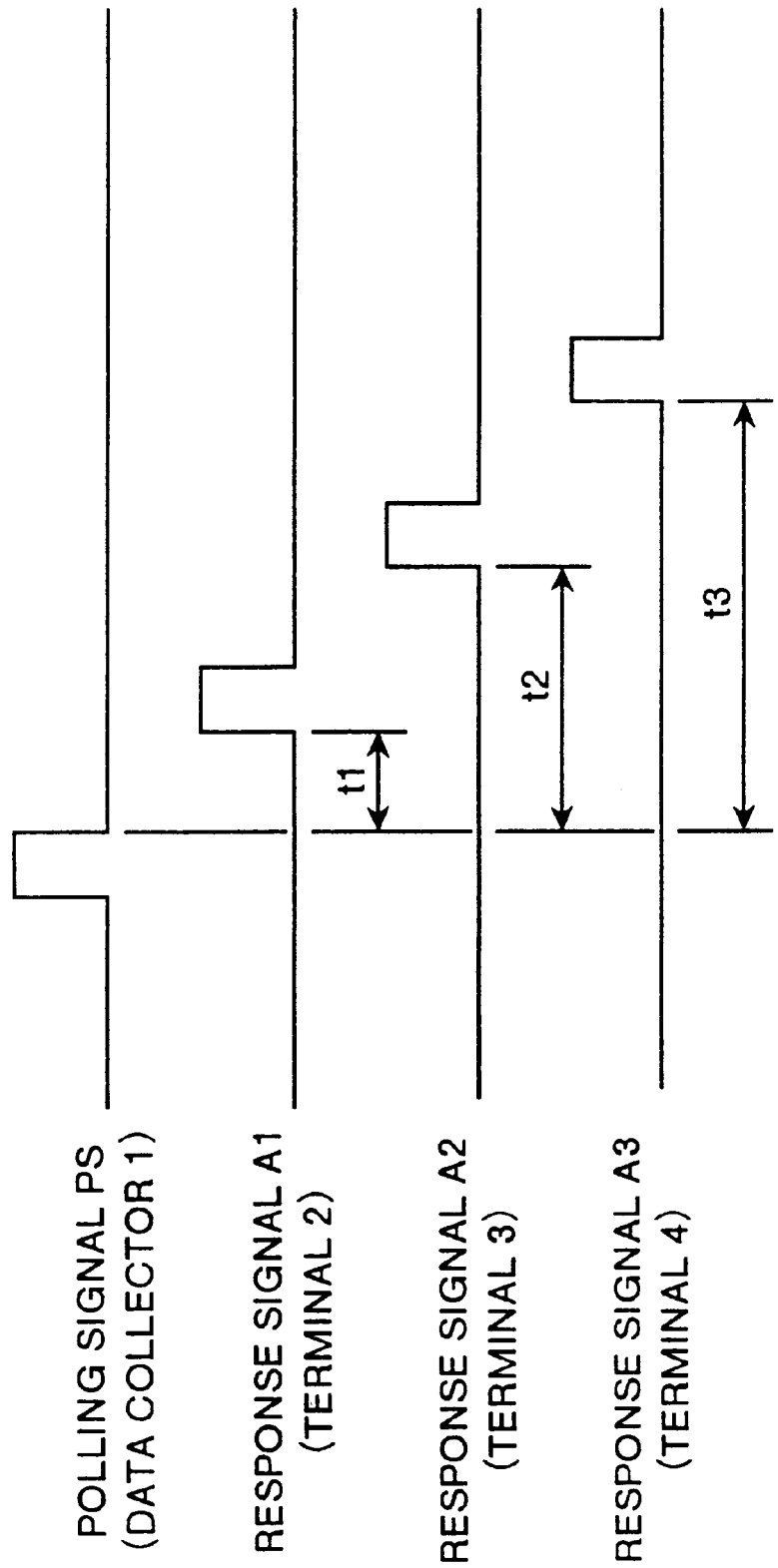
FIG. 6 is a timing chart between a polling signal and the response signal in the first embodiment.

Next, a description is made for operations. FIG. 6 is a timing chart between a polling signal and the response signal.

In the data collector 1, the control section 11 generates a polling signal PS by controlling the polling generating circuit 12 periodically or non-periodically. This polling signal PS is superimposed on the power line 5 as a spread signal after being subjected to spread spectrum modulation by the spreading section 21 with the spread code SC1. With this feature, polling is executed from the data collector 1 to all the terminal units 2, 3, and 4.

In the terminal units 2, 3, and 4, de-spread spectrum is always executed to high-frequency signals each passing through the BPF 37 in the de-spreading section 32. For this reason, when polling is executed from the data collector 1 as described above, the polling signals PS come thereinto each as a high-frequency spread signal via the power line 5, so that a signal enabling de-spread spectrum with the spread code SC1 can be demodulated as a polling signal PS.

The polling signal PS demodulated as described above is outputted from the communicating section 2B to the polling detecting circuit 42 in the terminal section 2A, and only this outputted polling signal PS is detected by the polling detecting circuit 42. The polling detecting circuit 42 supplies, when a polling signal PS is detected, the detected signal to the control section 41.

The control section 41 measures a period of time, when it recognizes polling upon supply of the detected signal thereto from the polling detecting circuit 42, using a timer 43, with a point of time when the polling signal is received as a reference. In each of the terminal units 2, 3, and 4, as shown in FIG. 6, a prepared response signal Ai is transmitted to the data collector 1 after a preset certain period of time ti (i is a natural number) different for each terminal, has passed.

In the terminal unit 2, a response signal A1 is prepared by the control section 41 after the polling signal is received, and the response signal Al is superimposed on the power line 5 using spread spectrum communication, after a specified period of time t1 at the polling signal PS is received. Similarly, in the terminal units 3 and 4, the signals are superimposed on the power line 5 using spread spectrum communication after a specified period of time t2, and t3 (t1<t2<t3) has passed, respectively.

Also in the data collector 1, like in each of the terminal units 2, 3, and 4, de-spread spectrum is always executed to a high-frequency signal passing through the BPF 27 in the despreading section 22. For this reason, when a response to the polling is to be successively received from each of the terminal units 2, 3, and 4 described above, response signals A1, A2, and A3 reach through the power line 5 as high-frequency spread signals, so that signals each enabling de-spread spectrum with the spread code SC1 can be demodulated as response signals A1, A2, and A3.

In the control section 11, if receiving from each of the terminal units 2, 3, 4 is a response, for instance, at a polling time PTN, data DTAN according to the response signal A1, data DTBN according to the response signal A2, and data DTCN according to the response signal A3 are stored in the data memory 13 in response to the response signals A1, A2, and A3 at the polling time PTN in the incoming order thereof (Refer to FIG. 5).

It should be noted that the data collector 1 executes data communication with an external device via the telephone line network TLN or the radio line network (radio line NWL) according to a request from the external device or to an operation of the data collector itself.

As described above, in accordance with the first embodiment, during communications between each of the terminal units 2, 3, 4 and the data collector 1 via the power line 5, each of the terminal units 2, 3, 4 transmits data subjected to spread spectrum modulation according to the polling signal sent from the data collector 1, and executes data collection by subjecting the received data to de-spread spectrum demodulation, so that each of the terminal units 2, 3, 4 has only to start an operation for transmission at a timing when a polling signal is sent thereto from the data collector 1, and with this feature, the data collector 1 can execute data collection even if each of the terminal units 2, 3, 4 does not confirm a transmission state of other terminal units.

In communications between each of the terminal units 2, 3, 4 and the data collector 1 via the power line 5, each of the terminal units 2, 3, 4 transmits data subjected to spread spectrum modulation according to polling signals simultaneously transmitted from the data collector 1 to a plurality of terminal units 2, 3, 4 after a certain period of time different from that in other terminal unit has passed, and the data collector 1 executes data collection by subjecting the received data to despread spectrum demodulation, so that, in a case where a polling signal is sent thereto from the data collector 1, each of the terminal units 2, 3, 4 has only to start an operation for transmission operation at a timing different from that in other terminal unit, and with this feature, the data collector 1 can execute data collection even if each of the terminal units 2, 3, 4 does not confirm a transmission state of other terminal units.

Data subjected to spread spectrum modulation using common spread code SC1 by the plurality of terminal units 2, 3, 4 is subjected to de-spread spectrum demodulation by a shared despreading circuit in the data collector, namely the despreading section 22, so that a unit of de-spreading circuit is only prepared in the side of data collector regardless of the number of terminal unit, and with this feature, the system configuration can be simplified.

The data collector 1 subjects a polling signal PS to spread spectrum modulation for transmission, and each of the terminal units 2, 3, 4 subjects the polling signal PS to de-spread spectrum demodulation for receiving, so that communications between transmission data and receiving data can be executed on the identical power line 5, and with this feature, modulation/demodulation processing for transmit-receive of data can be unified.

Data collection is set to be started up with a polling signal so that data can easily be requested to a plurality of terminal units 2, 3, 4 in batch.

The data collector 1 executes cable data communication with an external device via the telephone line network TLN, so that data collected by the data collector 1 from each of the terminal units 2, 3, 4 can be transferred to remote places through a cable line.

The data collector 1 executes bidirectional radio data communication with an external device through a radio terminal 7, so that data collected by the data collector from each of the terminal units 2, 3, 4 can be transferred to remote places through a radio line.

In the first embodiment described above, the data collector 1 collects data by polling in the preset order, so that the collector can determine which of the terminal units the data has been transmitted from without analyzing the received data (response signals A1 to A3), but like in the variation 1 of Embodiment 1 described below, the terminal units, from which data has been transmitted may be identified by analyzing the received data.

Figure 7:
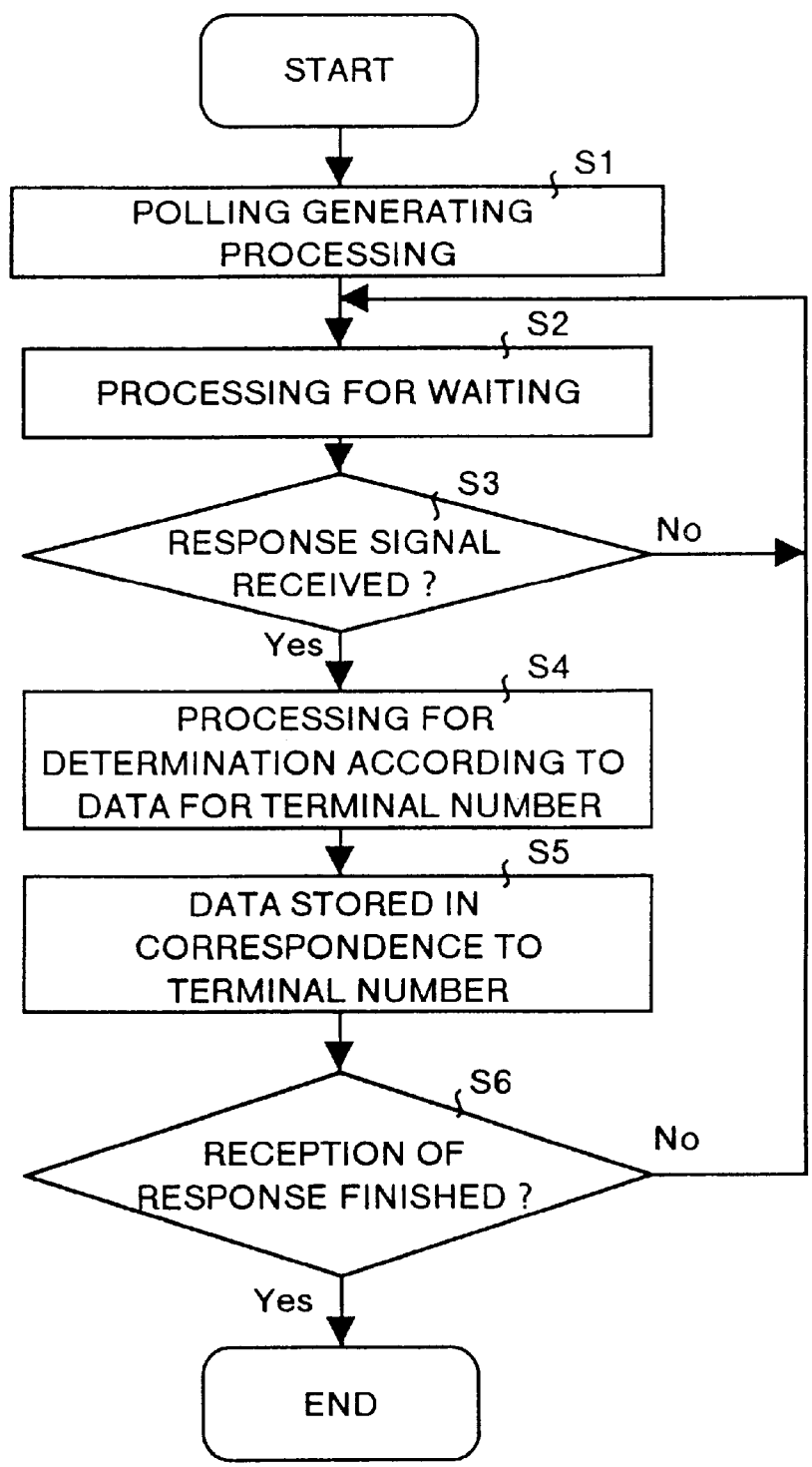
FIG. 7 is a flow chart for explanation of operations in the data collector according to variation 1 of the first embodiment.

FIG. 7 is a flow chart for explanation of operations in the data collector 1 according to the variation 1 of Embodiment 1. The operations according to this flow chart are controlled by the control section 11 in the data collector 1 according to the variation 1, but each of the operations can be executed by each unit connected to the control section 11.

At first, polling generating processing is executed periodically or non-periodically (step S1), received data is analyzed at a preset time slot after the polling is generated. In this case, a time interval for a time slot after polling is generated is set to a constant value, and with this feature, a certain period of time is waited (step S2), and then receiving of any of response signals A1, A2, and A3 is recognized (step S3).

When a response signal is recognized in step S3, data for the terminal number is extracted from the terminal number section of the response signal, and determination is made as to which terminal unit the response has come from, namely a terminal number (step S4). As described above, when the terminal number has been determined, data for the data section is stored in the memory area of the determined terminal number in correspondence to the polling time (step S5).

In a case where receiving for a number of time slots preset in correspondence to a number of response signals is not finished (step S6), processing returns to step S2, and the same processing as that described above is repeatedly executed. When all the receiving is finished, polling processing for one time is finished (step S6).

As described above, in accordance with the variation 1, each of the terminal units 2, 3, 4 adds identification data specific to a terminal, namely data for a terminal number to data when the data is subjected to spectrum modulation, and the data collector 1 manages data for each of the terminal units 2, 3, 4 according to the identification data added to the received data (response signals A1, A2, A3), namely the data for a terminal number, so that even after the data has been received by the data collector 1, it can easily be identified which terminal unit the data has come from.

In accordance with variation 2 of the first embodiment, a polling signal is simultaneously sent from the data collector 1 to all the terminal units 2, 3, and 4, but a polling signal may be discretely sent only selected terminal units.

Figure 8:
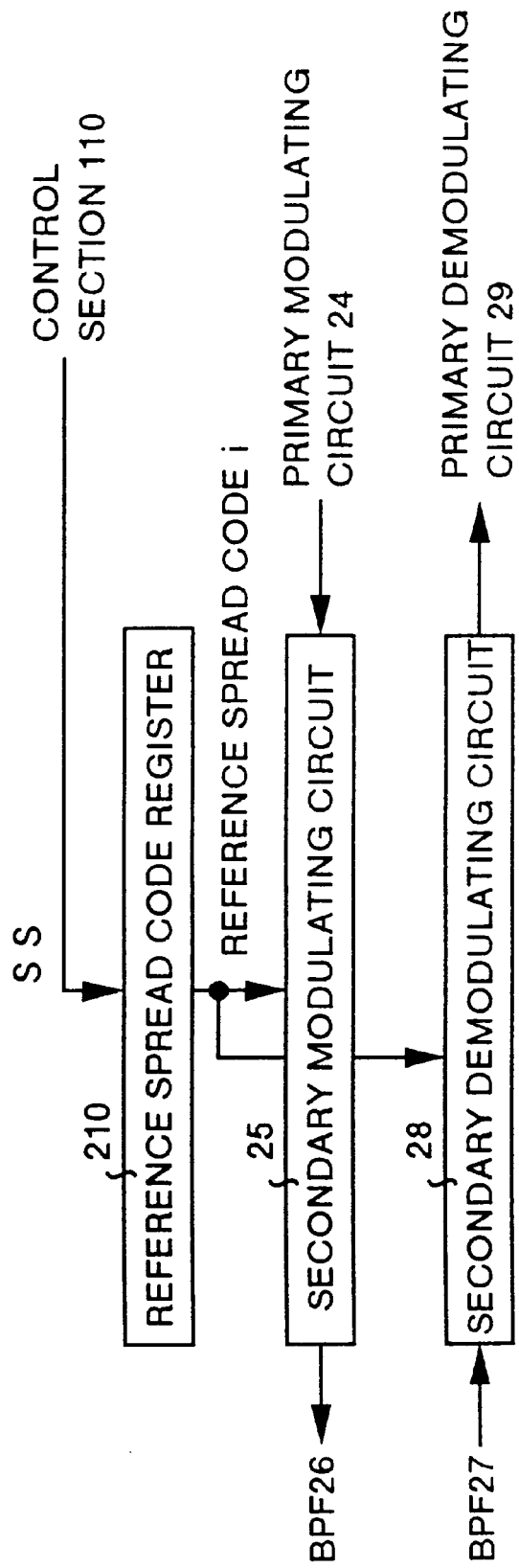
FIG. 8 is a block diagram showing key configuration of the data collector according to variation 2 of the first embodiment.

FIG. 8 is a block diagram showing configuration of a key section of the data collector 1 according to the variation 2. In the data collector 1 shown in FIG. 8, a reference spread code register 210 is connected to input terminals of the secondary modulating circuit 25 and the secondary demodulating circuit 28 respectively, and a control section 110 is connected to an input terminal of the reference spread code register 210. It should be noted that a different spread code is allocated to each of the terminal units 2, 3, 4 for spread spectrum communication.

The control section 110 functions like the control section 11 according to Embodiment 1 described above, and supplies a selection signal SS for selecting reference spread code having the same code array as that in spread code of the terminal unit 2, 3, or 4 as an object for polling to the reference spread code register 210.

The reference spread code register 210 maintains reference spread code identical to the spread code previously allocated to each of the terminal units 2, 3, 4 so that the code can freely be switched according to control provided by the control section 110.

In the configuration described above, when polling is executed, the reference spread code given to the secondary modulating circuit 25 and the secondary demodulating circuit 28 is switched to the spread code identical to that previously allocated to any of the terminal units as an object for data collection.

As described above, the data collector 1 according to the variation 2 requests a response signal only to any of the terminal units selected as an object for the data collection, and also can accurately receive the response signal, while each of the terminal units 2, 3, 4 can transmit a response signal according to detection of the polling without any delay due to using a timer.

In Embodiment 1 described above, data collection is executed from each of the terminal units 2, 3, 4 in a different period of time for each terminal, after polling is completed, but like in Embodiment 2 described below, data collection may simultaneously be executed from a plurality of terminal units, after polling. It should be noted that the same reference numerals and signs are assigned to the common configuration and signals corresponding to those in Embodiment 1 described above.

Figure 9:
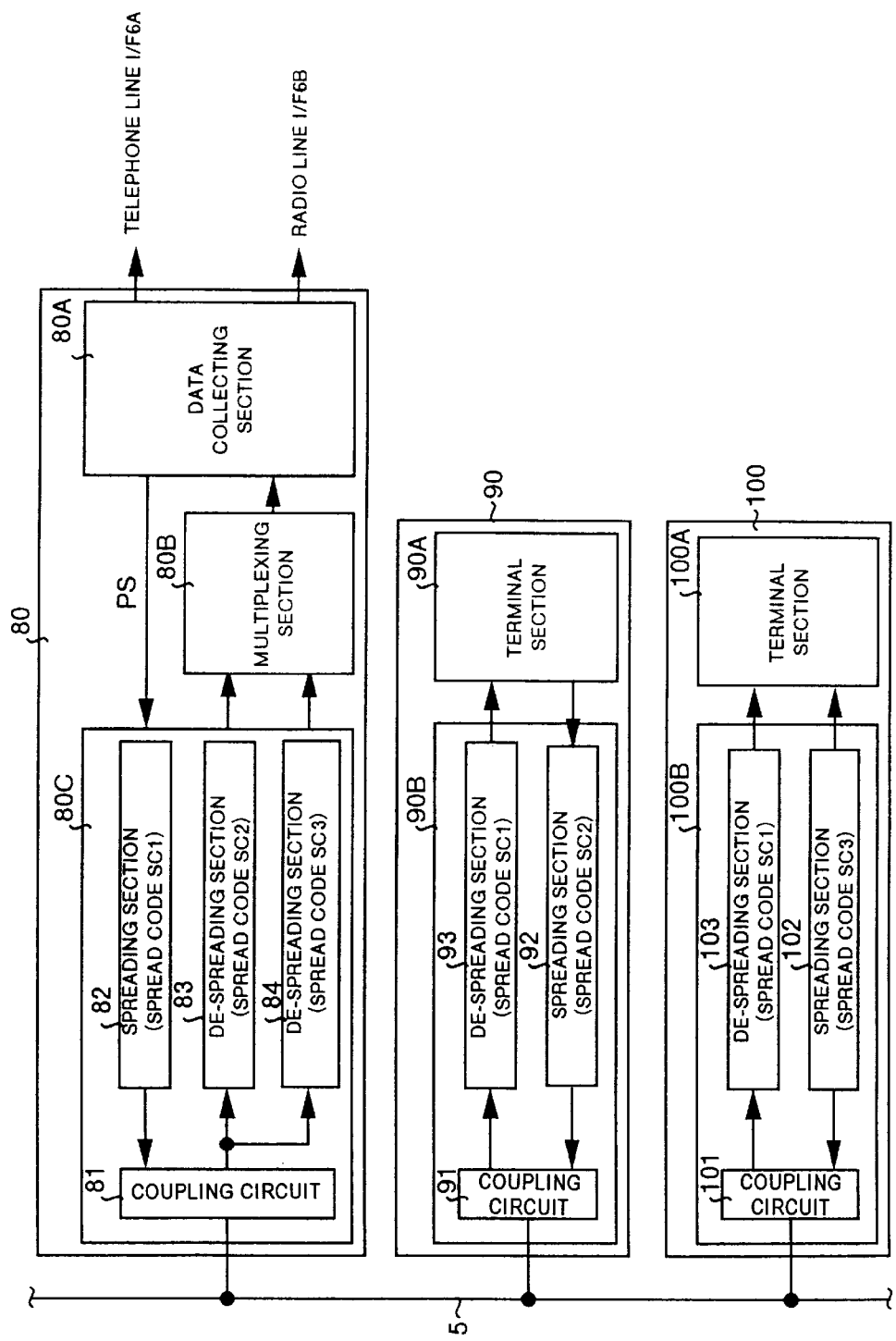
FIG. 9 is a block diagram showing the data collection system according to a second embodiment of the present invention.

FIG. 9 is a block diagram showing the data collection system according to Embodiment 2 of the present invention. The data collection system shown in FIG. 9 comprises a data collector 80 connected to a telephone line I/F 6A and a radio line I/F 6B, and a plurality of terminal units (e.g. terminal units 90, 100) for storing data each connected to a power line 5, and data communication is executed between the data collector 80 and each of the terminal units 90, 100 via the power line 5.

The data collector 80 comprises a data collecting section 80A, a multiplexing section 80B, and a communicating section 80C.

The data collecting section 80A has the same configuration as that of the data collecting section 1A applied to Embodiment 1, and is connected to the multiplexing section 80B, communicating section 80C, telephone line I/F 6A, and radio line I/F 6B. This data collecting section 80A superimposes a spread signal (polling signal PS) on the power line 5 via the communicating section 80C, and collects data sent from each of the terminal units 90, 100 via the communicating section 80C and multiplexing section 80B.

The communicating section 80C comprises a coupling circuit 81, a spreading section 82, and de-spreading sections 83, 84, and executes spread spectrum communication. The spreading section 82 and the de-spreading sections 83, 84 are connected to coupling circuit 81.

The spreading section 82 has the same configuration as that of the spreading section 21 applied to Embodiment 1, and also operates like in Embodiment 1, and the de-spreading sections 83, 84 have the same configuration as those in the de-spreading section 22 applied to Embodiment 1, and also operate like in Embodiment 1. Spread codes SC1, SC2, SC3 are allocated to the spreading section 82 and the de-spreading sections 83, 84 respectively.

This communicating section 80C subjects data from the data collector 80A to spread spectrum modulation by the spreading section 82, superimposes the spread signal on the power line 5, and transmits the signal to each of the terminal units 90 and 100, and also reversely subjects an incoming spread signal from each of the terminal units 90 and 100 via the power line 5 to de-spread spectrum demodulation by the de-spreading sections 83 and 84, and extracts a required data therefrom.

The multiplexing section 80B multiplexes data supplied from the de-spreading sections 83 and 84 respectively in the communicating section 80C, and supplies the multiplexed data to the data collecting section 80A.

The terminal units 90 and 100 comprise terminal sections 90A, 100A, and communicating sections 90B, 100B respectively. Each of the terminal sections 90A, 100A has the same configuration as that of each of the terminal sections 2A, 3A, 4A, and also operate like each of the terminal sections.

The communicating section 90B comprises a coupling circuit 91, a spreading section 92, and a de-spreading section 93, and the communicating section 100B comprises a coupling circuit 101, a spreading section 102, and a de-spreading section 103. Each of the communicating sections 90B and 100B has the same configuration as that in each of the communicating sections 2B, 3B, 4B applied to Embodiment 1, and also operates like each of the communicating sections. It should be noted that common spread code SC1 is allocated to the de-spreading sections 93, 103, and different spread codes SC2, SC3 are allocated to the spreading sections 92 and 102 respectively.

Next, a description is made for operations thereof. In Embodiment 2, when polling is performed by the data collector 80, each of the communicating section 90B, 100B subjects an incoming spread signal from the data collector 80 via the power line 5 to de-spread spectrum demodulation with common spread code SC1, and detects a polling signal PS.

After polling is detected, the communicating sections 90B, 100B subject data from terminal sections 90A and 100A to spread spectrum modulation with different spread codes SC2, SC3 respectively, superimpose the spread signals on the power line 5 as response signals and transmit the signals to the data collector 80. Timing for transmission of a response signal transmitted from each of the terminal units 90, 100 is set to the same time.

In the data collector 80, de-spread spectrum is always executed in the de-spreading section 83, 84. When a response to the polling has come from each of the terminal units 90, 100 as described above, the spread signal subjected to spread using the spread code SC2 in the terminal unit 90 is subjected to spread spectrum demodulation in the de-spreading section 83, and the spread signal subjected to spread using the spread code SC3 in the terminal unit 100 is subjected to spread spectrum demodulation in the de-spreading section 84.

Then, two regenerated response signals are multiplexed by the multiplexing section 80B, and stored in the data memory of the data collecting section 80A as multiplexed data.

In Embodiment 2, in a case where, for instance, 10 units of terminal unit each having the same configuration as that of each of the terminal units 90 and 100 are connected to the data collector 80, response signals simultaneously transmitted from ten units are superimposed on the power line 5. For this reason, a transmission speed of each of the response signals (spread signals) is preferably set to a value, for instance, 127 times as quicker as the reference, but the speed is not necessarily limited thereto, and may be variable to 64 times or the like.

As described above, with Embodiment 2, in communications between each of the terminal units 90, 100 and the data collector 80 via the power line 5, each of the terminal units 90, 100 transmits data subjected to spread spectrum modulation using the different spread codes SC2, SC3 for each terminal unit, and the data collector 80 executes data collection by subjecting the received data to de-spread spectrum demodulation using the same spread code as that used for spread spectrum modulation subjected to the data described above, so that the data collector 80 can simultaneously demodulate data from any of the terminal units using spread code specific to each of the terminal units.

For this reason, each of the terminal units 90, 100 has only to start an operation for transmission at a given timing in batch, and with this feature, the data collector 80 can execute data collection even if each of the terminal units 90, 100 does not confirm a transmission state of other terminal units.

The data collector 80 multiplexes received data from a plurality of terminal units 90, 100, and with this feature, data from the plurality of terminal units 90, 100 can be handled in batch as multiplexed data.

In Embodiment 2 described above, polling signals are simultaneously transmitted from the data collector 80 to all the terminal units 90 and 100, but a polling signal may discretely be transmitted only to a terminal unit as an object for data collection.

In this case, different spread codes are previously allocated to the de-spreading section in each of the terminal unit 90, 100 and the same reference spread code as those previously allocated to the terminal units 90 and 100 respectively are maintained in the spreading section 82 in the data collector 80 so that the code can freely be switched to each other, and when polling is executed, reference spread code to be given to the spreading section 82 in the data collector 80 is switched to the same code as that previously allocated to the terminal unit as an object for data collection.

With this feature, a response signal can be requested only to a terminal unit as the object for data collection, and also the data collector 80 comprises a de-spreading section corresponding to a spreading section in each of the terminal units 90, 100, so that, even if a response signal from any of the terminal units is received, the signal can accurately be received.

In Embodiment 2, dispersion in a signal power ratio of a response signal sent from each of the terminal units 90, 100 to the data collector 80 can be set to a constant value by the fact that the data collector 80 feedback-controls a power of a signal sent to the power line 5, or that each of the terminal units 90, 100 controls and sends a signal power at a terminal of the data collected according to a signal power of a polling signal PS sent from the data collector 80.

In Embodiment 2 described above, data is simultaneously collected from each of the terminal units 90, 100 in response to polling, but like in Embodiment 3 described below, by dividing a plurality of terminal units to some groups, allocating a different time slot to each of the groups, data may successively be collected for each group.

Figure 10:
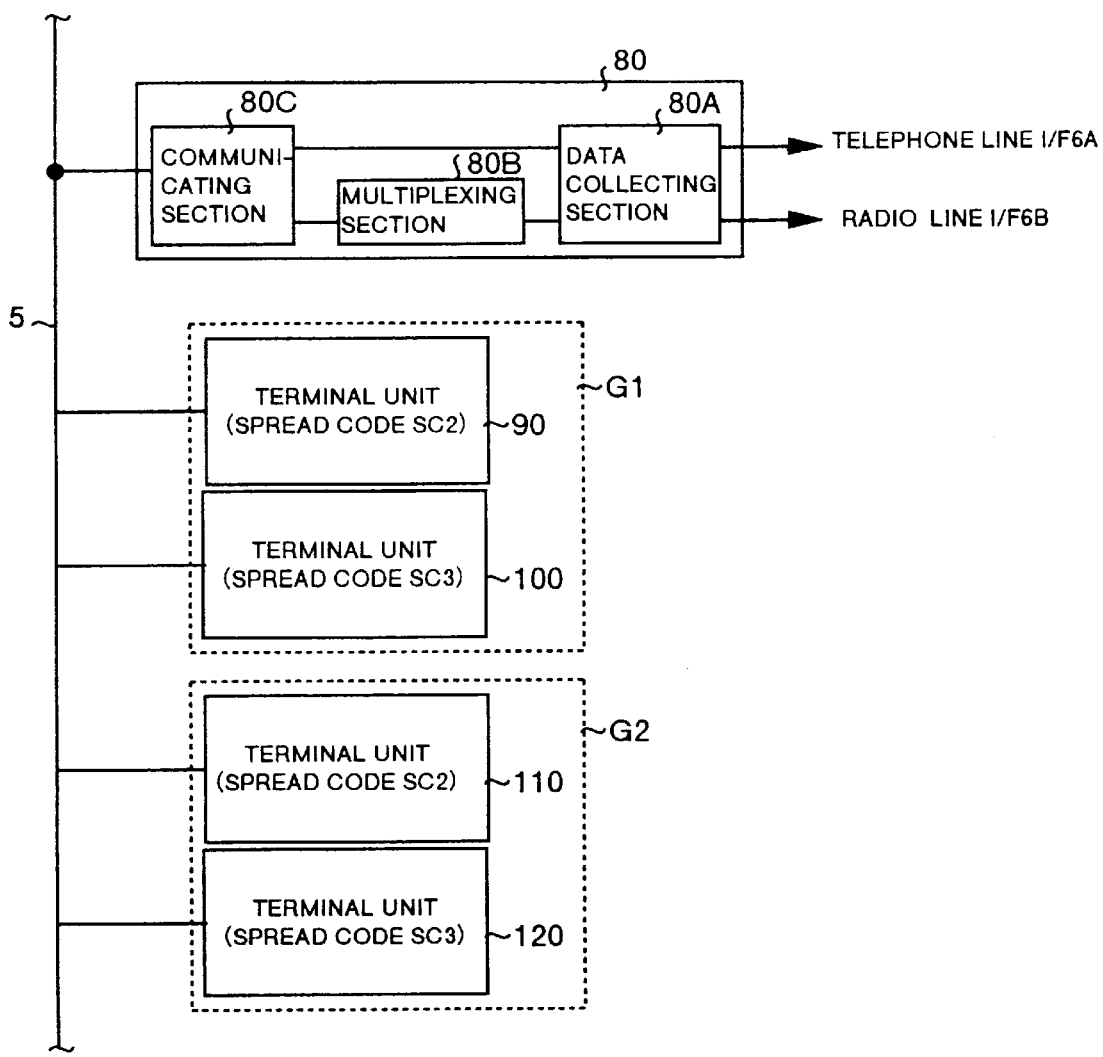
FIG. 10 is a block diagram showing the data collection system according to a third embodiment of the present invention.

FIG. 10 is a block diagram showing the data collection system according to Embodiment 3 of the present invention. In the data collection system shown in FIG. 10, the same reference numerals are assigned to the same configuration corresponding to those in Embodiment 2 described above, and description thereof is omitted herein.

In Embodiment 3, as shown in FIG. 10, a plurality of terminal units each connected to the power line 5 are divided to a plurality of groups (two groups as an example herein). A first group is a group G1, and comprises the terminal units 90 and 100 applied to Embodiment 2 described above. A second group is a group G2, and comprises terminal units 110 and 120 each having the same configuration and operating like each of the terminal units 90 and 100 applied to Embodiment 2 described above.

It should be noted that each of the terminal units 90, 100, 110, and 120 has a timer having the same function as that in each of the terminal section 2A, 3A, and 4A applied to Embodiment 1.

Namely, the terminal unit 110 is a device for executing spread spectrum modulation using the spread code SC2 like that in the terminal unit 90, and the terminal unit 120 is a device for executing spread spectrum modulation using the spread code SC3 like that in the terminal unit 100.

Next, a description is made for operations thereof. FIG. 11 is a timing chart between a polling signal and the response signal in Embodiment 3.

In Embodiment 3, polling is executed to the groups G1 and G2 in batch, and data collection is executed at a time slot allocated to each of the groups.

Then, the data collector 80 superimposes a spread signal on the power line 5 periodically or non-periodically according to the polling signal PS, and polling is executed to the groups G1 (terminal units 90, 100) and G2 (terminal units 110, 120) in batch.

The terminal units 90 and 100 in the group G1 provide response signals A11 and A12 prepared in a common certain period of time t11 preset respectively to spread spectrum modulation and transmit the signals to the data collector 80 as spread signals respectively. Similarly, the terminal units 110 and 120 in the group G2 provide response signals A13 and A14 prepared in a common certain period of time t12 preset respectively to spread spectrum modulation and transmit the signals to the data collector 80 as spread signals respectively. When the data collector 80 successively receives a response to the polling from each of the groups G1 and G2 as described above, as response signals A11, A12, A13, and A14 reach the device via the power line 5 as high-frequency spread signals, the collector subjects the signals from the terminal units 90, 110 to de-spread spectrum demodulation using the spread code SC2 to the response signals A11 and A13 respectively, and subjects the signals from the terminal units 100, 120 to de-spread spectrum demodulation using the spread code SC3 to the response signals A12 and A14, respectively.

It should be noted that, also in Embodiment 3, like Embodiment 2 described above, it is preferable that a transmission speed of a response signal (a spread signal) is set to a value for instance, 127 times as quicker as the reference, to provide simultaneous transmission from 10 units of terminal unit per each group.

As described above, with Embodiment 3, in communications between each of the groups G1, G2 and the data collector 80 via the power line 5, each of the groups G1, G2 responds to polling from the data collector 80 after a certain period of time different for each group, so that the data collector 80 can demodulate any data from any of the terminal units using a spread code specific to each of the terminal units in the order of groups G1 and G2.

For this reason, in a case where a polling signal PS is sent from the data collector 80, each of the terminal units in each of the group G1 and G2 has only to start an operation for transmission at a different timing from that in other terminal unit, and with this feature, the data collector 80 can execute data collection even if each of the terminal units does not confirm a transmission state of other terminal units.

It should be noted that, also in Embodiment 3, the same effects can be obtained in the common configuration and operations as those in Embodiment 1 (variations included therein) and Embodiment 2.

In Embodiment 3 described above, polling signals are simultaneously transmitted from the data collector 80 to groups G1 and G2, but a polling signal may discretely be transmitted only to a group as an object for data collection.

In this case, different types of spread code are previously allocated to each of the groups G1 and G2, and when polling is executed, by switching spread code given to the spreading section 82 in the data collector 80 to the spread code previously allocated to the group as an object for data collection, the data collector 80 can request a response signal only to the group as the object for data collection and accurately receive the response signal, and the groups G1 and G2 can also transmit response signals without any delay due to using a timer.

In Embodiments 1 to 3, all the data collection is executed mainly by the data collector according to polling, but like in Embodiment 4 described below, each of terminal units as a main device may execute periodical data collection, while the data collector may execute only non-periodical data collection according to polling therefrom.

FIG. 12 is a block diagram showing the data collection system according to Embodiment 4 of the present invention. It should be noted that the same reference numerals are assigned to the section corresponding to those in Embodiment 1, and description thereof is omitted herein.

The data collection system shown in FIG. 12 comprises a data collector 130, and terminal units 140, 150, 160 each connected with the power line 5.

The data collector 130 comprises a communicating section not shown herein like that in the data collector 1 according to Embodiment 1, and a data collecting section 131. The data collecting section 131 includes a timer 132 and a set time table 133 therein.

The timer 132 is used for providing time data to a control section not shown herein. The set time table 133 stores each time for periodical collection previously allocated to each of the terminal units 140, 150, 160 by making them correspond to terminal numbers as set time T1, T2, and T3. As for the terminal numbers, No. 1 indicates a terminal unit 140, No. 2 indicates a terminal unit 150, and No. 3 indicates a terminal unit 160 respectively. It should be noted that set time data T1, T2, T3 indicate, for instance, clocks different at a certain time interval within a day from each other.

The terminal units 140, 150, and 160 comprise communicating sections each not shown herein like that in the terminal units 2, 3, and 4 according to Embodiment 1, and terminal sections 141, 151, and 161 respectively. The terminal sections 141, 151, and 161 include therein timers 142, 152, 162, and set time registers 143, 153, and 163.

The timers 142, 152, 162 are used each for providing a time to a control section not shown herein. The set time registers 143, 153, 163 store data for set time T1, T2, T3 each previously allocated to each of the terminal units 140, 150, and 160.

As a case where data collection is executed non-periodically in the present embodiment is the same as that in Embodiment 1 described above, description of the operations in that case is omitted herein.

In a case where data collection is executed periodically, data collection is executed mainly by each of the terminal units 140, 150, 160, and each of the terminal units 140, 150, 160 recognizes a time according to control provided by the control section not shown herein, and when the preset time (T1, T2, T3) comes, each of the units subjects data to spectrum modulation and transmits the data to the data collector 130 as a spread signal.

In contrast to the above case, the data collector 130 recognizes a time according to control provided by the control section not shown herein, and regenerates a signal reaching the preset time (T1, T2, T3) by subjecting the signal to de-spread spectrum demodulation to the original data.

As described above, with Embodiment 4, in communications between each of the terminal units 140, 150, 160 and the data collector 130 via the power line 5, in a case where data collection is executed periodically, even if data collection is executed mainly by each of the terminal units 140, 150, 160, each of the terminal units 140, 150, 160 has only to start an operation for transmission by itself at a preset time different from those in other terminal units, and with this feature, the data collector 130 can execute data collection even if one the terminal units 140, 150, 160 do not confirm a transmission state of other terminal units.

Also in Embodiment 4, data can be transmitted at the same time mainly by terminal units if data can be subjected to despread according to different spread codes each allocated to each of the terminal units 140, 150, 160 in the data collector 130 like in Embodiment 1.

As described above, with a data collection system according to the present invention, in communications between each of terminal units and a data collector through a power line, each of the terminal units transmits data subjected to spread spectrum modulation according to a specified request signal transmitted from the data collector, and the data collector subjects the received data to de-spread spectrum demodulation and executes data collection, so that each of the terminal units has only to start an operation for transmission at a timing when a specified request signal is sent thereto from the data collector, and with this feature it is possible to obtain a data collection system in which the data collector can execute data collection even if each of the terminal units does not confirm a transmission state of other terminal units.

With a data collection system according to the present invention, in communications between each of terminal units and a data collector through a power line, each of the terminal units transmits data subjected to spread spectrum modulation according to a specified request signal simultaneously transmitted from the data collector to a plurality of terminal units after a certain period of time in any of the plurality of terminal units different from that in other terminal units has passed, and the data collector subjects the received data to de-spread spectrum demodulation and executes data collection, so that each of the terminal units has only to start an operation for transmission at a timing different from those set in other terminal units at a point of time when a specified request signal is sent thereto from the data collector. With this feature, it is possible to obtain a data collection system in which the data collector can execute data collection even if each of the terminal units does not confirm a transmission state of other terminal units.

With a data collection system according to the present invention, in communications between each of terminal units and a data collector through a power line, each of the terminal units transmits data subjected to spread spectrum modulation at a preset clock different from that in other terminal unit, and the data collector subjects the received data to spectrum reverse spread demodulation and executes data collection, so that each of the terminal units only starts transmitting operations by itself at a preset clock different from those in other terminal units. With this feature, it is possible to obtain a data collection system in which the data collector can execute data collection even if each of the terminal units does not confirm a transmission state of other terminal units.

With a data collection system according to the present invention, data subjected to spread spectrum modulation using common specified spread code by a plurality of terminal units is subjected to de-spread spectrum demodulation by a shared despreading circuit in the data collector, so that a unit of despreading circuit is only prepared in the side of data collector regardless of the number of terminal unit, and with this feature, it is possible to obtain a data collection system in which system configuration can be simplified.

With a data collection system according to the present invention, in communications between each of terminal units and a data collector through a power line, each of the plurality of terminal units transmits data subjected to spread spectrum modulation using spread code different for each terminal unit, and the data collector subjects the received data to de-spread spectrum demodulation using the spread code identical to that used for subjecting the data to spread spectrum modulation and executes data collection, so that the data collector can demodulate data from any of the terminal units using spread code specific to each of the terminal units, and for this reason, each of the terminal units has only to start an operation for transmission at a given timing. With this feature, it is possible to obtain a data collection system in which the data collector can execute data collection even if each of the terminal units does not confirm a transmission state from other terminal unit.

With a data collection system according to the present invention, in communications between each of terminal units and a data collector through a power line, each of the terminal units transmits data subjected to spread spectrum modulation using spread code different from that in each of the terminal units in at least the same terminal group according to a specified request signal simultaneously transmitted from the data collector to a plurality of terminal groups after a certain period of time different from that in each of the terminal groups has passed, and the data collector subjects the received data to de-spread spectrum modulation using the spread code identical to that used for subjecting the data to spread spectrum modulation and executes data collection, so that the data collector can subject data from any of the terminal units to demodulation using spread code specific to each of the terminal units. For this reason, each of the terminal groups has only to start an operation for transmission at a timing different from that in other terminal groups in a case where a specified request signal is sent thereto from the data collector, and with this feature, it is possible to obtain a data collection system in which the data collector can execute data collection even if each of the terminal units does not confirm a transmission state of other terminal units.

With a data collection system according to the present invention, the data collecting means multiplexes data from the plurality of terminal units, demodulated by the demodulating means and with this feature, it is possible to obtain a data collection system in which data from the plurality of terminal units can be handled as multiplexed data in batch.

With a data collection system according to the present invention, the data collector subjects a specified request signal to spread spectrum modulation for transmission, and each of the terminal units subjects the specified request signal to de-spread spectrum demodulation for receiving, so that communications between the specified request signal and the data can be executed on the identical power line. With this feature, it is possible to obtain a data collection system in which modulation/demodulation processing for transmit-receive of data can be unified.

With a data collection system according to the present invention, a specified request signal is transmitted as a polling signal, so that it is possible to obtain a data collection system in which request signals can easily be transmitted to a plurality of terminal units in batch.

With a data collection system according to the present invention, each of the terminal units adds identification data specific to each terminal unit to data when the data is subjected to modulation, and the data collector manages the data in each of the terminal units according to the added identification data to the received data, so that it is possible to obtain a data collection system in which the data collector can identify which terminal unit the data is sent from even after the data has been received thereby.

With a data collection system according to the present invention, the data collector executes cable data communication with an external device via a telephone line, so that it is possible to obtain a data collection system in which data from each of the terminal units collected by the data collector can be transferred to remote places through a cable line.

With a data collection system according to of the present invention, the data collector executes radio data communication with an external device through a radio terminal connected thereto, so that it is possible to obtain a data collection system in which data from each of the terminal units collected by the data collector can be transferred to remote places through a radio line.

This application is based on Japanese patent application No. HEI 8-225580 filed in the Japanese Patent Office on Aug. 27, 1996, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A data collection system comprising:
   a plurality of terminal units each having a memory for storing therein data to be collected by the data collection system;
   a data collector; and
   a power line connecting each of said plurality of terminal units to said data collector with data communication being executed between each of said plurality of terminal units and said data collector via said power line,
   each terminal unit including
      a modulating circuit configured to read out data from the memory of the respective terminal unit according to a common request signal transmitted from said data collector and subject said data to spread spectrum modulation, and
      a data transmitting circuit configured to transmit via said power line data modulated by said modulating circuit to said data collector, and
   said data collector including
      a request signal transmitting circuit configured to transmit said common request signal via said power line to each of said plurality of terminal units,
      a demodulating circuit configured to subject data from each of said plurality of terminal units received via said power line, after transmission from said request signal transmitting circuit, to spread spectrum demodulation, and
      a data collecting circuit configured to collect data according to the data demodulated by said demodulating circuit, wherein
   said plurality of terminal units execute spread spectrum modulation using a common specified spread code in said modulating circuit and said demodulating circuit is a shared reversely spreading circuit for subjecting data modulated by each of said plurality of terminal units to reverse spread spectrum demodulation using said specified spread code.

2. A data collection system comprising:
   a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a modulating circuit configured to read out data from the memory of the respective terminal unit according to a common request signal transmitted from said data collector and subject said data to spread spectrum modulation, and a data transmitting circuit configured to transmit via said power line data modulated by said modulating circuit to said data collector, and said data collector including a request signal transmitting circuit configured to transmit said common request signal via said power line to each of said plurality of terminal units, a demodulating circuit configured to subject data from each of said plurality of terminal units received via said power line, after transmission from said request signal transmitting circuit, to spread spectrum demodulation, and a data collecting circuit configured to collect data according to the data demodulated by said demodulating circuit, wherein said request signal transmitting circuit is further configured to subject said specified request signal to spread spectrum modulation and transmit the modulated request signal, and each of said plurality of terminal units is configured to subject said specified request signal to spread spectrum demodulation and receive the demodulated request signal.

3. A data collection system according to claim 2, wherein said specified request signal is a polling signal.

4. A data collection system comprising:

a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a modulating circuit configured to read out data from the memory of the respective terminal unit according to a common request signal transmitted from said data collector and subject said data to spread spectrum modulation, and a data transmitting circuit configured to transmit via said power line data modulated by said modulating circuit to said data collector, and said data collector including a request signal transmitting circuit configured to transmit said common request signal via said power line to each of said plurality of terminal units, a demodulating circuit configured to subject data from each of said plurality of terminal units received via said power line, after transmission from said request signal transmitting circuit, to spread spectrum demodulation, and a data collecting circuit configured to collect data according to the data demodulated by said demodulating circuit, wherein said data collector is connected to a telephone line interface connected to a telephone line and executes cable data communication with an external device connected through said telephone line interface to said telephone line.

5. A data collection system comprising:

a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a modulating circuit configured to read out data from the memory of the respective terminal unit according to a common request signal transmitted from said data collector and subject said data to spread spectrum modulation, and a data transmitting circuit configured to transmit via said power line data modulated by said modulating circuit to said data collector, and said data collector including a request signal transmitting circuit configured to transmit said common request signal via said power line to each of said plurality of terminal units, a demodulating circuit configured to subject data from each of said plurality of terminal units received via said power line, after transmission from said request signal transmitting circuit, to spread spectrum demodulation, and a data collecting circuit configured to collect data according to the data demodulated by said demodulating circuit, wherein said data collector is further connected to a radio line interface connected to a radio terminal, and executes radio data communication with an external device connected via said radio line interface and said radio terminal to the radio line.

6. A data collection system comprising:

a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a timer configured to measure a certain period of time in any of said plurality of terminal units different from that in other terminal units according to a common request signal simultaneously transmitted from said data collector to said plurality of terminal units, a modulating circuit configured to read out data from the memory of the respective terminal unit according to said common request signal and subject said data to spread spectrum modulation, and a data transmitting circuit configured to transmit via said power line data modulated by said modulating circuit to said data collector at a point of time when measurement of said certain period of time by said timer is attained, and said data collector including a request signal transmitting circuit configured to transmit said common request signal via said power line to each of said plurality of terminal units, a demodulating circuit configured to subject data from each of said plurality of terminal units received via said power line in response to transmission of said common request signal from said request signal transmitting circuit, to reverse spread spectrum demodulation, and a data collecting circuit configured to collect data according to the data demodulated by said demodulating circuit, wherein said plurality of terminal units execute spread spectrum modulation using a common specified spread code in said modulating circuit and said demodulating circuit is a shared reversely spreading circuit for subjecting data modulated by each of said plurality of terminal units to reverse spread spectrum demodulation using said specified spread code.

7. A data collection system comprising:

a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a timer configured to measure a certain period of time in any of said plurality of terminal units different from that in other terminal units according to a common request signal simultaneously transmitted from said data collector to said plurality of terminal units, a modulating circuit configured to read out data from the memory of the respective terminal unit according to said common request signal and subject said data to spread spectrum modulation, and a data transmitting circuit configured to transmit via said power line data modulated by said modulating circuit to said data collector at a point of time when measurement of said certain period of time by said timer is attained, and said data collector including a request signal transmitting circuit configured to transmit said common request signal via said power line to each of said plurality of terminal units, a demodulating circuit configured to subject data from each of said plurality of terminal units received via said power line in response to transmission of said common request signal from said request signal transmitting circuit, to reverse spread spectrum demodulation, and a data collecting circuit configured to collect data according to the data demodulated by said demodulating circuit, wherein said request signal transmitting circuit is further configured to subject said specified request signal to spread spectrum modulation and transmit the modulated request signal, and each of said plurality of terminal units is configured to subject said specified request signal to reverse spread spectrum demodulation and receive the demodulated request signal.

8. A data collection system according to claim 7, wherein said specified request signal is a polling signal.

9. A data collection system comprising:

a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a timer configured to measure a certain period of time in any of said plurality of terminal units different from that in other terminal units according to a common request signal simultaneously transmitted from said data collector to said plurality of terminal units, a modulating circuit configured to read out data from the memory of the respective terminal unit according to said common request signal and subject said data to spread spectrum modulation, and a data transmitting circuit configured to transmit, via said power line, data modulated by said modulating circuit to said data collector at a point of time when measurement of said certain period of time by said timer is attained, and said data collector including a request signal transmitting circuit configured to transmit said common request signal via said power line to each of said plurality of terminal units, a demodulating circuit configured to subject data from each of said plurality of terminal units received via said power line in response to transmission of said common request signal from said request signal transmitting circuit, to reverse spread spectrum demodulation, and a data collecting circuit configured to collect data according to the data demodulated by said demodulating circuit, wherein said data collector is connected to a telephone line interface connected to a telephone line and executes cable data communication with an external device connected through said telephone line interface to said telephone line.

10. A data collection system comprising:

a plurality of terminal units each having a memory for storing therein data to be collected by the data collection system;

a data collector; and a power line connecting each of said plurality of terminal units to said data collector with data communication being executed between each of said plurality of terminal units and said data collector via said power line, each terminal unit including a timer configured to measure a certain period of time in any of said plurality of terminal units different from that in other terminal units according to a common request signal simultaneously transmitted from said data collector to said plurality of terminal units, a modulating circuit configured to read out data from the memory of the respective terminal unit according to said common request signal and subject said data to spread spectrum modulation, and a data transmitting circuit configured to transmit via said power line data modulated by said modulating circuit to said data collector at a point of time when measurement of said certain period of time by said timer is attained, and said data collector including a request signal transmitting circuit configured to transmit said common request signal via said power line to each of said plurality of terminal units, a demodulating circuit configured to subject data from each of said plurality of terminal units received via said power line in response to transmission of said common request signal from said request signal transmitting circuit, to reverse spread spectrum demodulation, and a data collecting circuit configured to collect data according to the data demodulated by said demodulating circuit, wherein said data collector is further connected to a radio line interface connected to a radio terminal, and executes radio data communication with an external device connected via said radio line interface and said radio terminal to the radio line.

11. A data collection system comprising:

a plurality of terminal units each having a memory for storing data therein to be collected by the data collection system;

a data collector; and a power line connecting each of said plurality of terminal units to said data collector with data communication being executed between each of said plurality of terminal units and said data collector via said power line, each terminal unit including
 a timer configured to provide a clock time,
 a modulating circuit configured to read out data from the memory of the respective terminal unit at a point of time when the clock time provided by said timer reaches a present clock time, different from the preset clock time set in any other terminal unit among said plurality of terminal units, and subject said data to spread spectrum modulation, and
 a data transmitting circuit configured to transmit via said power line data modulated by said modulating circuit to said data collector, and said data collector including
 a demodulating circuit configured to subject data received via said power line from each of said plurality of terminal units to reverse spread spectrum demodulation, and
 a data collecting circuit configured to execute data collection according to the data demodulated by said demodulating circuit, wherein said plurality of terminal units execute spread spectrum modulation using a common specified spread code in said modulating circuit and said demodulating circuit is a shared reversely spreading circuit for subjecting data modulated by each of said plurality of terminal units to reverse spread spectrum demodulation using said specified spread code.

12. A data collection system comprising:

a plurality of terminal units each having a memory for storing data therein to be collect ed by th e data collection system;

a data collector; and a power line connecting each of said plurality of terminal units to said data collector with data communication being executed between each of said plurality of terminal units and said data collector via said power line, each terminal unit including
 a timer configured to provide a clock time,
 a modulating circuit configured to read out data from the memory of the respective terminal unit at a point of time when the clock time provided by said timer reaches a present clock time, different from the preset clock time set in any other terminal unit among said plurality of terminal units, and subject said data to spread spectrum modulation, and
 a data transmitting circuit configured to transmit via said power line data modulated by said modulating circuit to said data collector, and said data collector including
 a demodulating circuit configured to subject data received via said power line from each of said plurality of terminal units to reverse spread spectrum demodulation, and
 a data collecting circuit configured to execute data collection according to the data demodulated by said demodulating circuit, wherein each of said plurality of terminal units stores therein identification data different from those stored in other terminal units among said plurality of terminal units, said modulating circuit is further configured to add said identification data to data read out from its own memory and subject the combined data to modulation, and said data collecting circuit is further configured to manage said demodulated data according to the identification data included in said data for each of said plurality of terminal units.

13. A data collection system comprising:

a plurality of terminal units each having a memory for storing data therein to be collected by the data collection system;

a data collector; and a power line connecting each of said plurality of terminal units to said data collector with data communication being executed between each of said plurality of terminal units and said data collector via said power line, each terminal unit including
 a timer configured to provide a clock time,
 a modulating circuit configured to read out data from the memory of the respective terminal unit at a point of time when the clock time provided by said timer reaches a present clock time, different from the preset clock time set in any other terminal unit among said plurality of terminal units, and subject said data to spread spectrum modulation, and a data transmitting circuit configured to transmit via said power line data modulated by said modulating circuit to said data collector, and said data collector including
 a demodulating circuit configured to subject data received via said power line from each of said plurality of terminal units to reverse spread spectrum demodulation, and
 a data collecting circuit configured to execute data collection according to the data demodulated by said demodulating circuit, wherein said data collector is connected to a telephone line interface connected to a telephone line and executes cable data communication with an external device connected through said telephone line interface to said telephone line.

14. A data collection system comprising:

a plurality of terminal units each having a memory for storing data therein data to be collected by the data collection system;

a data collector; and a power line connecting each of said plurality of terminal units to said data collector with data communication being executed between each of said plurality of terminal units and said data collector via said power line, each terminal unit including
- a modulating circuit configured to read data from the memory of the respective terminal and subject the data to spread spectrum modulation using a spread code different from a spread code allocated to any other terminal unit among said plurality of terminal units, and
- a data transmitting circuit configured to transmit data modulated by said modulating circuit via said power line to said data collector, and said data collector including
- a demodulating circuit containing spread codes allocated to each of said plurality of terminal units respectively, and configured to subject data received via said power line from each of said plurality of terminal units to reverse spread spectrum demodulation using the spread code identical to the spread code used for spread spectrum modulation for the received data, and
- a data collecting circuit configured to execute data collection according to the data demodulated by said demodulating circuit.

15. A data collection system according to claim 14, wherein said data collecting circuit is further configured to multiplex data from said plurality of terminal units demodulated by said demodulating circuit.

16. A data collection system according to claim 14, wherein each of said plurality of terminal units stores therein identification data different from those stored in other terminal units among said plurality of terminal units, said modulating circuit is further configured to add said identification data to data read out from its own memory and subject the combined data to modulation, and said data collecting circuit is further configured to manage said demodulated data according to the identification data included in said data for each of said plurality of terminal units.

17. A data collection system according to claim 14, wherein said collector is connected to a telephone line interface connected to a telephone line and executes cable data communication with an external device connected through said telephone line interface to said telephone line.

18. A data collection system according to claim 14, wherein said data collector is further connected to a radio line interface connected to a radio terminal, and executes radio data communication with an external device connected via said radio time interface and said radio terminal to said radio line.

19. A data collection system comprising:
- a plurality of terminal groups having one or a plurality of terminal units each having a memory for storing data therein to be collected by the data collection system;
- a data collector; and
- a power line connecting each of said plurality of terminal groups to said data collector with data communication being executed between each of said plurality of terminal groups and said data collector via said power line, each terminal unit including
- a timer configured to measure a certain period of time in a group of terminal units among said plurality of terminal unit groups according to a common request signal simultaneously transmitted from said data collector to said plurality of terminal groups,
- a modulating circuit configured to read out data from the memory of the respective terminal unit according to said common request signal and subject said data to spread spectrum modulation using a spread code different from the spread code allocated to any other terminal unit in at least the same terminal group, and
- a data transmitting circuit configured to transmit via said power line data modulated by said modulating circuit to said data collector at a point of time when measurement of said certain period of time by said timer is attained, and said data collector including
- a request signal transmitting circuit configured to transmit said common request signal via said power line to each of said plurality of terminal units,
- a demodulating circuit containing therein spread codes allocated to each of said plurality of terminal units respectively, and configured to subject data received after transmission from said request signal transmitting circuit via said power line from each of said plurality of terminal units to reverse spread spectrum demodulation using the spread code identical to the spread code used in spread spectrum modulation for said data, and
- a data collecting circuit configured to execute data collection according to data demodulated by said demodulating circuit, wherein said request signal transmitting circuit is further configured to subject said specified request signal to spread spectrum modulation and transmit the modulated request signal, and each of said plurality of terminal units is configured to subject said specified request signal to spread spectrum demodulation and receive the demodulated request signal.

20. A data collection system according to claim 19; wherein said specified request signal is a polling signal.

21. A data collection system comprising:
- a plurality of terminal groups having one or a plurality of terminal units each having a memory for storing data therein to be collected by the data collection system;
- a data collector; and
- a power line connecting each of said plurality of terminal groups to said data collector with data communication being executed between each of said plurality of terminal groups and said data collector via said power line, each terminal unit including
- a timer configured to measure a certain period of time in a group of terminal units among said plurality of terminal unit groups according to a common request signal simultaneously transmitted from said data collector to said plurality of terminal groups,
- a modulating circuit configured to read out data from the memory of the respective terminal unit according to said common request signal and subject said data to spread spectrum modulation using a spread code different from the spread code allocated to any other terminal unit in at least the same terminal group, and
- a data transmitting circuit configured to transmit via said power line data modulated by said modulating circuit to said data collector at a point of time when measurement of said certain period of time by said timer is attained, and said data collector including
- a request signal transmitting circuit configured to transmit said common request signal via said power line to each of said plurality of terminal units, a demodulating circuit containing therein spread codes allocated to each of said plurality of terminal units respectively, and configured to subject data received after transmission from said request signal transmitting circuit via said power line from each of said plurality of terminal units to reverse spread spectrum demodulation using the spread code identical to the spread code used in spread spectrum modulation for said data, and a data collecting circuit configured to execute data collection according to data demodulated by said demodulating circuit, wherein said data collector is connected to a telephone line interface connected to a telephone line and executes cable data communication with an external device connected through said telephone line interface to said telephone line.

22. A data collection system comprising:

a plurality of terminal groups having one or a plurality of terminal units each having a memory for storing data therein to be collected by the data collection system;

a data collector; and a power line connecting each of said plurality of terminal groups to said data collector with data communication being executed between each of said plurality of terminal groups and said data collector via said power line, each terminal unit including
- a timer configured to measure a certain period of time in a group of terminal units among said plurality of terminal unit groups according to a common request signal simultaneously transmitted from said data collector to said plurality of terminal groups,
- a modulating circuit configured to read out data from the memory of the respective terminal unit according to said common request signal and subject said data to spread spectrum modulation using a spread code different from the spread code allocated to any other terminal unit in at least the same terminal group, and
- a data transmitting circuit configured to transmit via said power line data modulated by said modulating circuit to said data collector at a point of time when measurement of said certain period of time by said timer is attained, and said data collector including
- a request signal transmitting circuit configured to transmit said common request signal via said power line to each of said plurality of terminal units,
- a demodulating circuit containing therein spread codes allocated to each of said plurality of terminal units respectively, and configured to subject data received after transmission from said request signal transmitting circuit via said power line from each of said plurality of terminal units to reverse spread spectrum demodulation using the spread code identical to the spread code used in spread spectrum modulation for said data, and
- a data collecting circuit configured to execute data collection according to data demodulated by said demodulating circuit, wherein said data collector is further connected to a radio line interface connected to a radio terminal, and executes radio data communication with an external device connected via said radio line interface and said radio terminal to the radio line.

23. A method of collecting data from a plurality of terminals comprising the steps of:

generating a common polling signal at a central location to request responses from each of said plurality of terminals;

performing spread spectrum modulation of the common polling signal;

transmitted the modulated common polling signal to said plurality of terminals;

at least one of said plurality of terminals performing spread spectrum demodulation of the modulated common polling signal and sending a response from said at least one of said plurality of terminals to said central location after a predetermined time interval after receiving the modulation-polling signal, wherein said predetermined time interval is unique for each of said plurality of terminals.

24. The method of claim 23, wherein said modulated polling signal is transmitted via a power line.

* * * * *